US006876837B2

(12) United States Patent
Kuroshima et al.

(10) Patent No.: US 6,876,837 B2
(45) Date of Patent: Apr. 5, 2005

(54) PORTABLE ELECTRONIC EQUIPMENT

(75) Inventors: Yutaka Kuroshima, Tokyo (JP); Masaru Kitahara, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 716 days.

(21) Appl. No.: 09/819,600

(22) Filed: Mar. 29, 2001

(65) Prior Publication Data

US 2001/0034211 A1 Oct. 25, 2001

(30) Foreign Application Priority Data

Apr. 21, 2000 (JP) ....................................... 2000-121441
Oct. 27, 2000 (JP) ....................................... 2000-327941

(51) Int. Cl.[7] .................................................. H04B 1/38
(52) U.S. Cl. .................. 455/90.3; 455/575.1; 200/344; 345/168; 361/814; 379/433.07
(58) Field of Search ................................ 455/90.3, 128, 455/351, 575.1, 349, 350, 347–348; 345/168; 379/433.07; 361/814, 816; 200/344

(56) References Cited

U.S. PATENT DOCUMENTS 5,565,865 A * 10/1996 So .............................. 341/20

* cited by examiner

*Primary Examiner*—Lee Nguyen
(74) *Attorney, Agent, or Firm*—McGinn & Gibb PLLC

(57) ABSTRACT

A portable electronic equipment is capable of preventing warpage of an internal substrate accommodated therein due to pressing operations of button keys to thereby improve the mechanical strength thereof and contribute a downsizing thereof. To this end, a stopper 14 is provided on a front case 1 for limiting the amount of depression of each button key 8. The stopper 14 has a shape to support an entire outer periphery of a flange 15 of each button key or a shape to support an outer periphery of a flange 15 of each button key radially in a plurality of directions. Also, key seats 19 for the button keys are connected with each other in a bridge-shaped configuration, or formed separately or independently from each other. In addition, the front cover is provided with a case cover for preventing the button keys from popping out therefrom.

2 Claims, 7 Drawing Sheets

PORTABLE ELECTRONIC EQUIPMENT

BACKGROUND OF THE INVENTION

1. Field of the Invention

The present invention relates to a portable electronic equipment with such a structure of a portable terminal such as, for example, a portable telephone, PHS, a cordless telephone, a handy game gear, etc., having button keys adapted to be pushed in to operate, and in particular, it relates to a button key's structure capable of reducing stresses on a board received in a casing.

2. Description of the Related Art

For a typical example of portable electronic equipment of the above kind, there has been well known a portable telephone, an example of which is illustrated in FIGS. 10(*a*) and 10(*b*), FIG. 11 and FIG. 12. FIGS. 10(*a*) and 10(*b*) are a front elevational view and a side view, respectively, of the conventional portable telephone; FIG. 11 is an enlarged cross sectional view taken along line A—A, showing a structure of a key switch employed in the portable telephone; and FIG. 12 is an enlarged plan view of the key switch, showing a button key and a button key seat thereof.

The portable telephone 110 as illustrated in FIGS. 10 through 12 has a outer housing or casing comprising a front case 111 and a rear case 112 detachably assembled with each other, and a circuit board 12 for radio signal transmission and reception accommodated in the casing with an antenna 116 being projected from the casing. In this case, the cases 111, 112 are integrally connected with each other by means of fitting engagement using concavo-convex engagement between concaves and convexes, or engagement recesses and protrusions, or by means of screws. Also, on the surface of the front case 111, there are provided an LCD (liquid crystal display) 113, a microphone 114, a receiver 115, and a plurality of key switches 117. In this case, each key switch 117 includes a button key 118 ordinarily formed of ABS or the like and a button key seat 119 ordinarily formed of silicon rubber or the like. Each button key 118 is formed on a periphery of near-bottom portion thereof with a flange 125 extending slightly radially outwards from a side surface thereof.

The circuit board 129 built in the portable telephone 110 is provided on its surface opposite the button keys 118 with a key seat 123 and a plurality of elastic plate-shaped switch contacts in the form of click plates 122 at locations corresponding to the positions of the button keys 118. On a surface of the circuit board 129 facing the rear case 112 there are mounted electronic components 121 such as LSIs, silicon chips and the like. With such a construction, when a button key 118 is depressed or pushed in for purposes of dialing or the like, the button key seat 119 together with the depressed button key 118 is caused to move downwards, pressing the corresponding click plate 122 for switching operation.

In this case, an upward movement of each button key 118 is limited by the flange 125 thereof which is placed into abutting engagement with the rear or inner surface of the front case 111, but there is no such a limitation on a downward movement of each button key 118. Thus, as a button key 118 is being pushed in more and more, it is caused to move further in the downward direction with the result that the circuit board 129 is subjected to an increasing stress. On the other hand, recently used portable electronic with equipment such as portable telephones and the like, the thickness of a circuit board is becoming thinner for the purpose of reducing the weight and size thereof, so many of them have a thickness of 0.6 mm or below. As a result, the circuit board 129 is more and more liable to be subjected to frequent stresses upon manipulation of the button keys 118 or the like, which is undesirable from the point of view of durability.

With the conventional portable electronic equipment described above, there are employed a lot of button keys 118 of which movements in their returning direction are limited to a certain stroke. However, there is no limitation to their movements in a depressing direction, so the larger a thrust or pressing force applied to a button key 118, the greater stress will be given to the circuit board 129 inside the cases 111, 112. Moreover, the circuit board 129 accommodated in the cases 111, 112 is becoming thinner (e.g., the thickness of 0.6 mm being in the mainstream) and hence weakened against stress according to a downsizing of the portable electronic equipment. For these reasons, with the portable electronic equipment in which the button keys 118 are frequently operated, there is a fear that frequent deformations or warpings of the circuit board 129 might cause cracks in soldered portions of the electronic components mounted on the circuit board 129 or breakage of such electronic components.

In this regard, to prevent the deformation or warpage of the circuit board 129 according to the repeated pushing or pressing operations to the button keys 118, it might be considered that unillustrated bosses are provided on the rear case 112 which is in contact with the back side of the circuit board 129. However, it is substantially impossible to provide such bosses at the locations corresponding to the back side portions of all the button keys 118.

SUMMARY OF THE INVENTION

The present invention is intended to obviate the above-mentioned problems and has for its object to provide a portable electronic equipment which is capable of preventing any undue or excessive stress from being given to a circuit board even if a large pushing or pressing force is applied to a button key, thus avoiding the occurrence of cracks in soldered portions of the electronic components mounted on the circuit board or breakage of such electronic components and at the same time of contributing to a downsizing thereof.

In order to achieve the above object, according to one aspect of the present invention, there is provided a portable electronic equipment comprising: a casing; a circuit board accommodated in the casing and having a plurality of switch contacts formed thereon; a plurality of button keys corresponding to the switch contacts and mounted on the casing, the button keys being adapted to be depressed for switching on and off the corresponding switch contacts from outside; and a plurality of stoppers each provided on the casing for limiting an amount of depression of a corresponding one of the button keys.

In a preferred form of the present invention, the button keys are each formed with a flange, and the stoppers are each formed into such a configuration as to support an entire outer periphery of the flange of a corresponding button key.

In another preferred form of the present invention, the button keys are each formed with a flange, and the stoppers are each formed into such a configuration as to support an outer periphery of the flange of a corresponding button key in a plurality of directions.

In a further preferred form of the present invention, a key seat is disposed on the circuit board and has a plurality of seat sections corresponding to the button keys, the key sections being connected to each other through bridging portions. With this arrangement, the key seat is partially attached to the circuit board, so that both the weight and the cost of the portable electronic equipment can be reduced.

In a still further preferred form of the present invention, a key seat is disposed on the circuit board and has a plurality of seat sections corresponding to the button keys, the seat sections being formed independent of each other. With this arrangement, too, the key seat is partially attached to the circuit board, and hence both the weight and the cost of the portable electronic equipment can be reduced.

In a yet further preferred form of the present invention, a case cover is provided on the casing for preventing the button keys from popping out of the casing. Thus, by the provision of the case cover on the casing, it is possible to prevent the button keys from popping our of the casing and at the same time cope with alterations in the appearance of the casing.

In a further preferred form of the present invention, when one of the button keys is pushed in, a corresponding one of the stoppers is placed into abutment against a corresponding flange to thereby limit an amount of depression of the one button key.

In a further preferred form of the present invention, the casing comprises a front case having an outer surface and an inner surface on opposite sides thereof and a rear case detachably assembled with the front case, and the stoppers are provided on the inner surface of the front case at locations at which the corresponding button keys are exposed from the outer surface of the front case.

According to another aspect of the present invention, there is provided a portable electronic equipment comprising: a casing having a plurality of openings formed therethrough at predetermined locations: a circuit board accommodated in the casing and mounting thereon electronic components and a key seat, the key seat having a plurality of click plates at locations corresponding to the openings in the casing, each of the click plates being adapted to be pushed in to generate a switch signal; a plurality of button keys disposed in the openings, respectively, and each having a manipulation end face protruded from a corresponding one of the openings; a button key seat disposed at an end of each of the button keys opposite the manipulation end face thereof and having a plurality of contacts which are each placed into abutment against a corresponding one of the click plates upon depression of a corresponding button key; and a plurality of stoppers provided at the openings, respectively, in the casing for limiting an amount of movement of a corresponding button key in a direction toward the circuit board.

According to a further aspect of the present invention, there is provided a portable electronic equipment comprising: a casing having a plurality of openings formed therethrough at predetermined locations: a circuit board accommodated in the casing and mounting thereon electronic components and a key seat, the key seat having a plurality of click plates at locations corresponding to the openings in the casing, each of the click plates being adapted to be pushed in to generate a switch signal; a plurality of button keys disposed in the openings respectively, and each having a manipulation end face protruded from a corresponding one of the openings; a button key seat disposed at an end of each of the button keys opposite the manipulation end face thereof and having a plurality of contacts which are each placed into abutment against a corresponding one of the click plates upon depression of a corresponding button key; and a stopper provided at the openings in the casing for limiting an amount of movement of each of the button key seats in a direction toward the circuit board.

In a further preferred form of the present invention, the button keys and the button key seat are integrally formed with each other. In a further preferred form of the present invention, the stopper comprises a suppression plate disposed in the casing and fixedly attached to the casing.

With the above arrangement, the amount of depression of each button key is restricted by the stopper or stoppers no matter how the button key is pushed, the circuit board will not be subjected to any exessive stress and a pressing force acting on a button key is received and supported by the strong or rigid casing. As a result, it is possible to avoid destruction of the circuit board due to such a pressing force on the button key even if the thickness of the circuit board is limited.

The above and other objects, features and advantages of the present invention will become readily apparent to those skilled in the art from the following detailed description of preferred embodiments of the present invention taken in conjunction with the accompanying drawings.

BRIEF DESCRIPTION OF THE INVENTION

FIG. 1(*b*) is a side elevation of the portable telephone of FIG. 1(*a*).

FIG. 7(*b*) is a side elevation of the portable telephone of FIG. 7(*a*).

FIG. 10(*b*) is a side elevation of the conventional portable telephone of FIG. 10(*a*).

Figure 10:
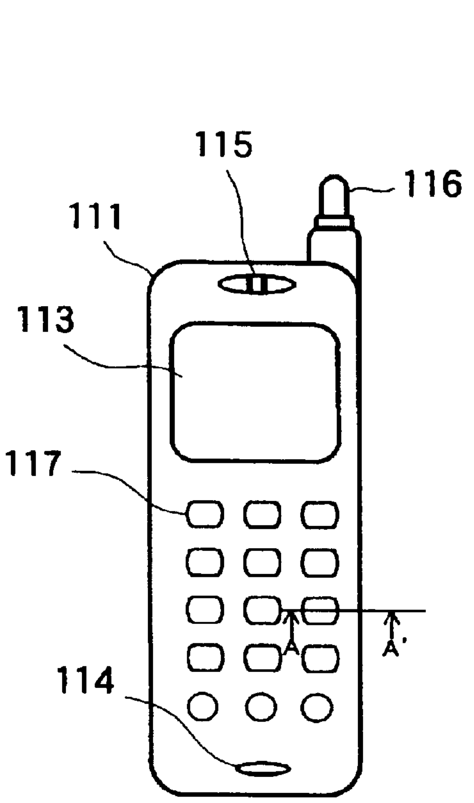
Fig.10 (a) PRIOR ART
FIG. 10(*a*) is a front elevation illustrating a conventional portable telephone.
Figure 10:
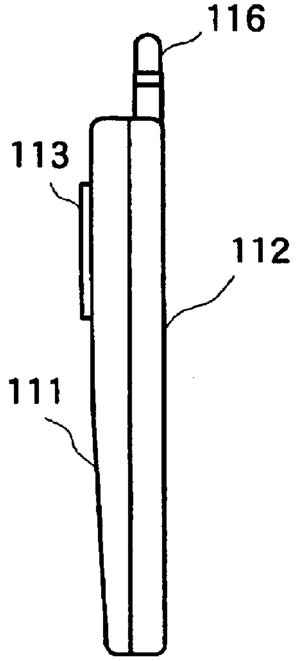
Fig.10 (b) PRIOR ART
Figure 11:
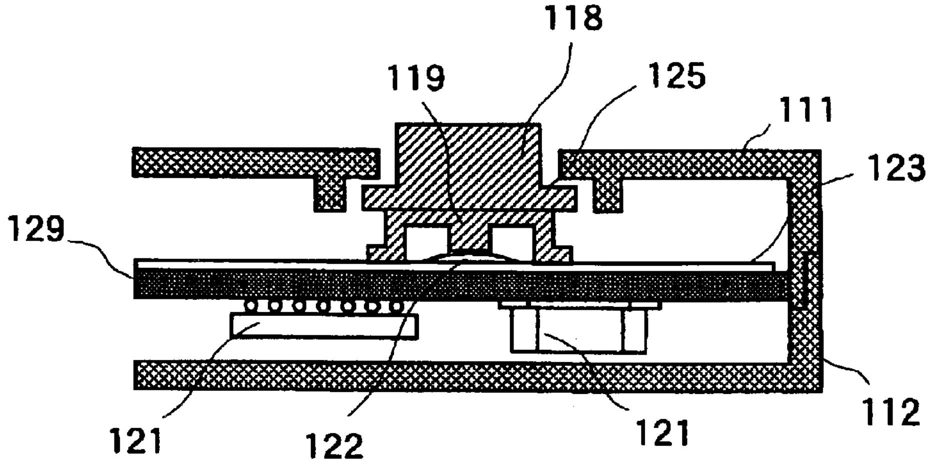
Fig.11 PRIOR ART

The FIG. 11 is an enlarged cross sectional view as seen from line A—A of FIG. 10.

Figure 12:
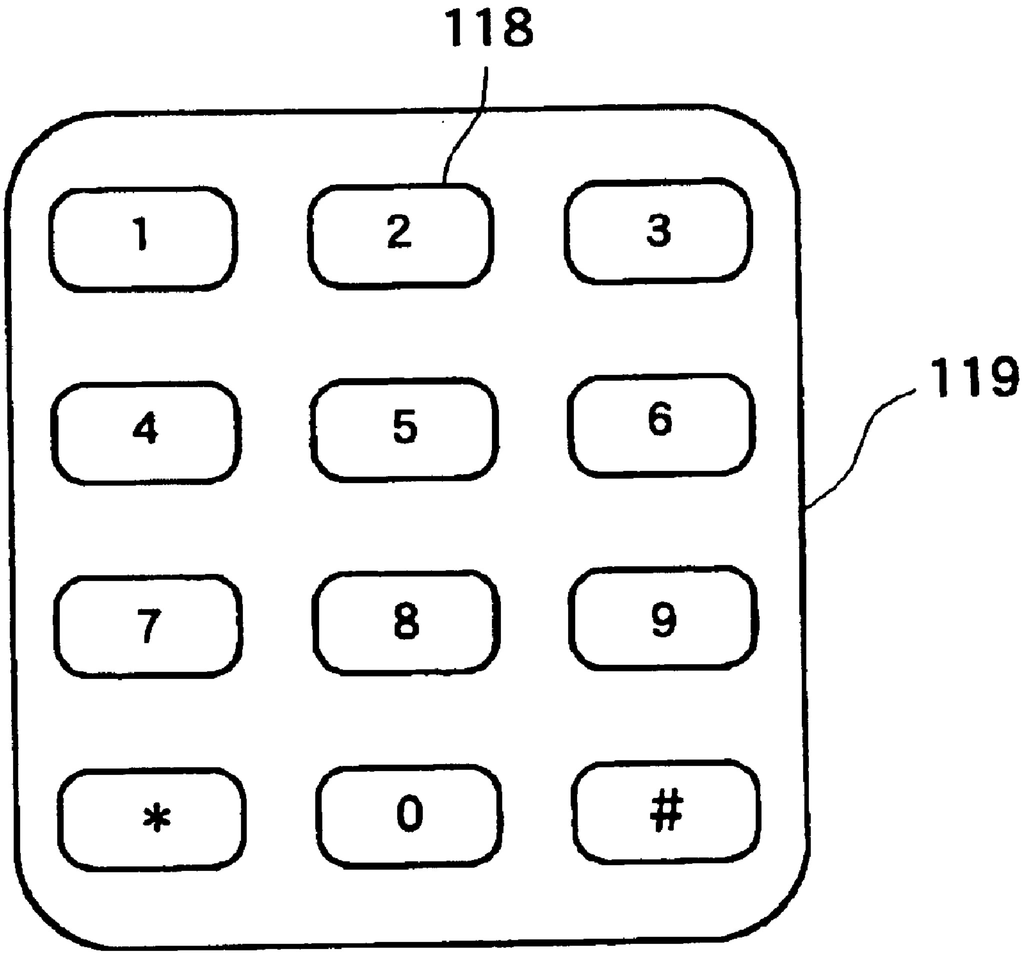
Fig. 12 PRIOR ART

FIG. 12 is an enlarged plan view illustrating button keys and a button key seat of a key switch used in the portable telephone of FIG. 10.

DESCRIPTION OF THE PREFERRED EMBODIMENTS

Now, preferred embodiments of the present invention will be described in detail while referring to the accompanying drawings.

Figure 1:
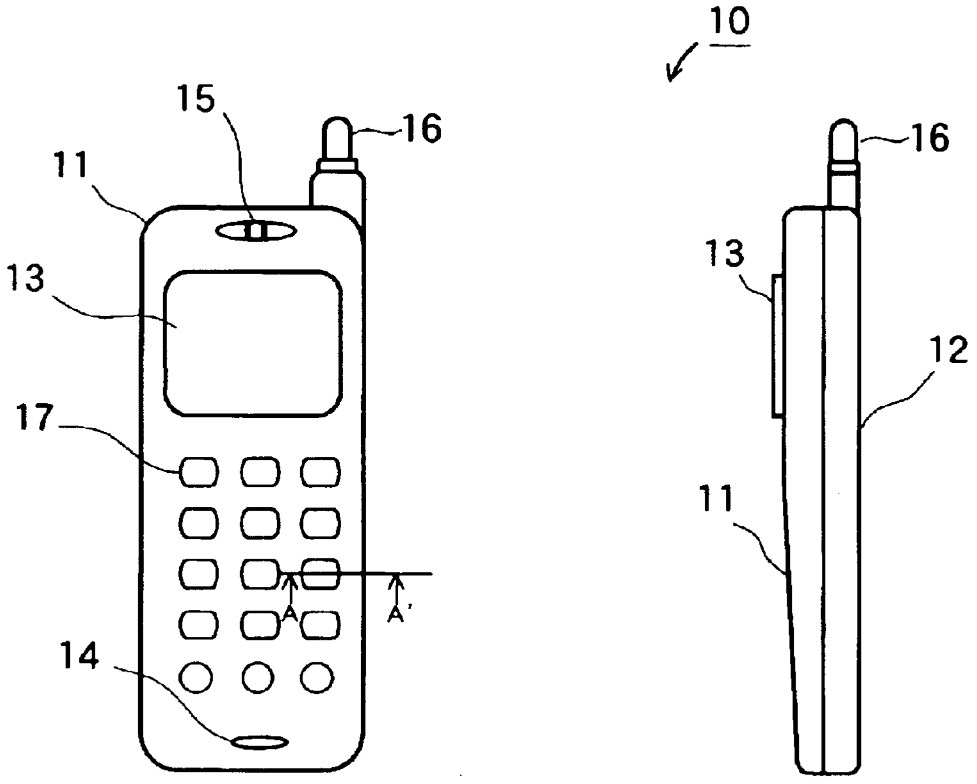
FIG. 1(*a*) is a front elevation illustrating the external appearance of a portable electronic equipment in the form of a portable telephone in accordance with one embodiment of the present invention.
Figure 2:
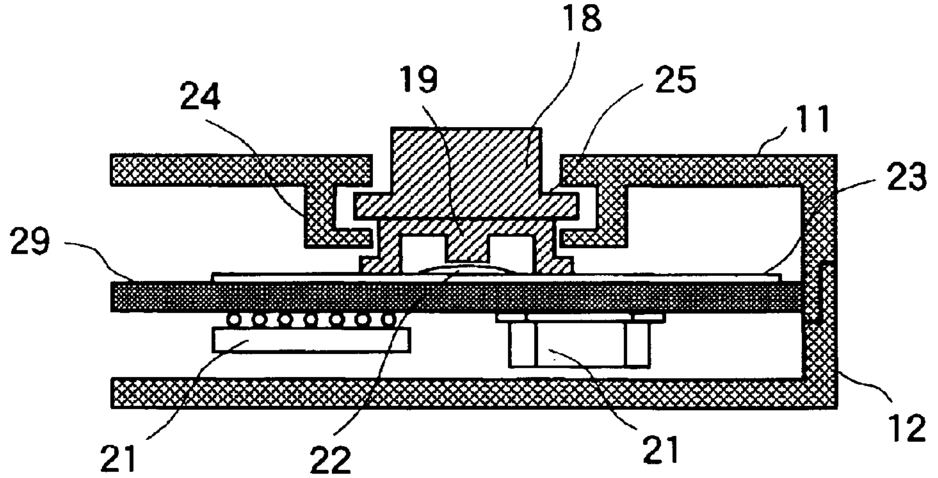
FIG. 2 is an enlarged cross sectional view as seen from line A—A of FIG. 1.
Figure 3:
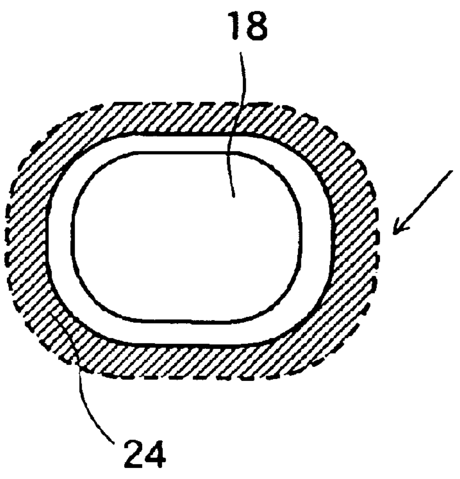
FIG. 3 is a plan view illustrating an example of the structure of a stopper illustrated in FIG. 2.
Figure 3:
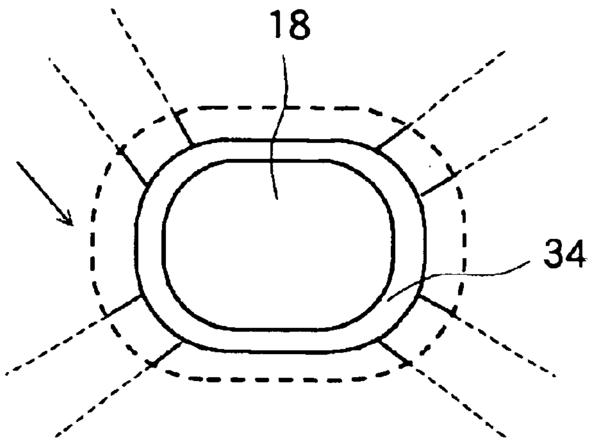
Figure 4:
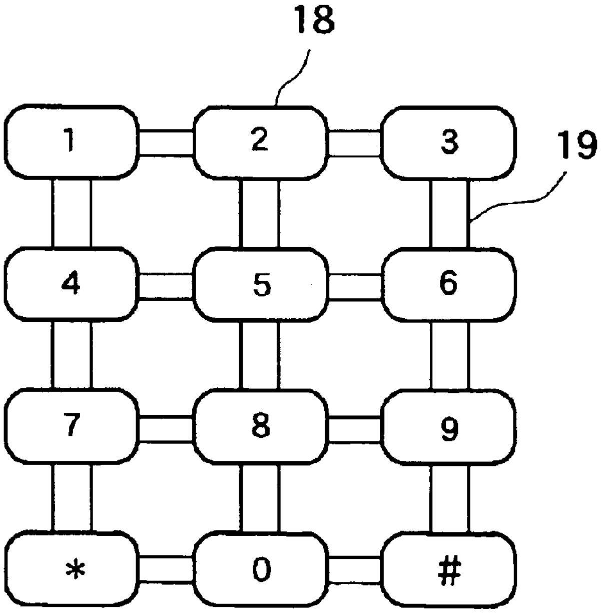
FIG. 4 is a plan view for explaining the structure of a button key and a button key seat illustrated in FIG. 2.
Figure 5:
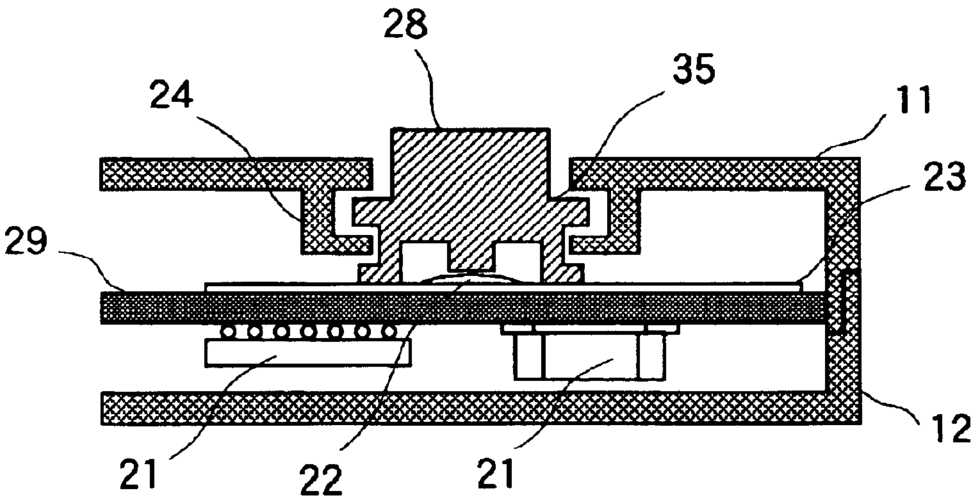
FIG. 5 is a cross sectional view of a modified form of portable telephone according to the present invention.
Figure 6:
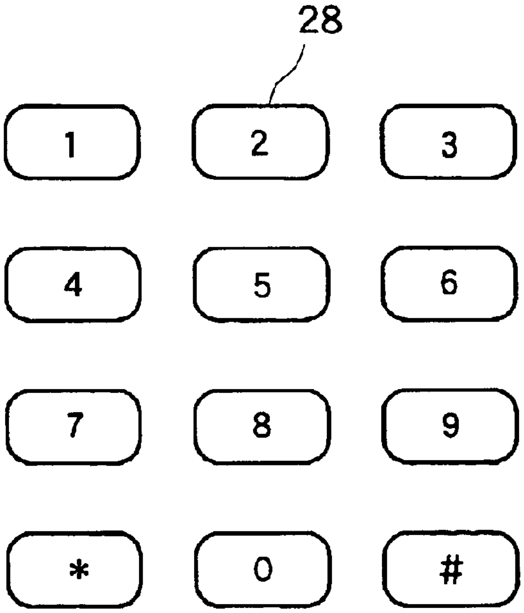
FIG. 6 is a plan view for explaining the arrangement of a button key of FIG. 5.
Figure 7:
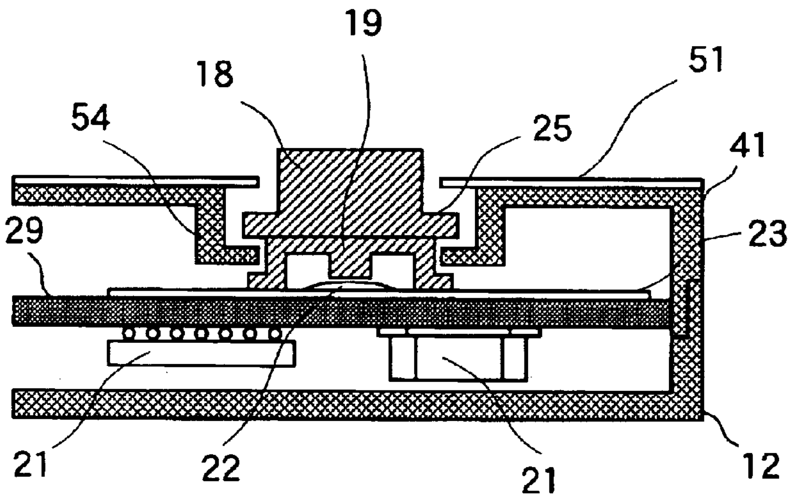
FIG. 7(*a*) is a cross sectional view of another modified form of portable telephone according to the present invention.
Figure 7:
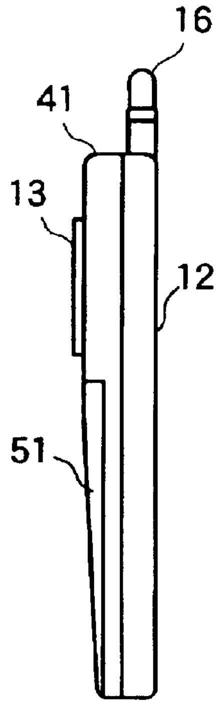
Figure 8:
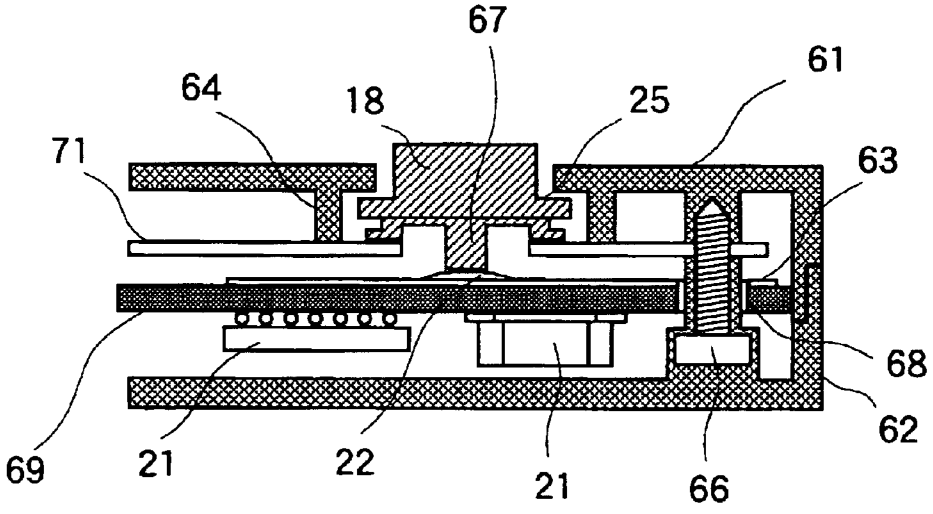
FIG. 8 is a cross sectional view of a further modified form of portable telephone according to the present invention.
Figure 9:
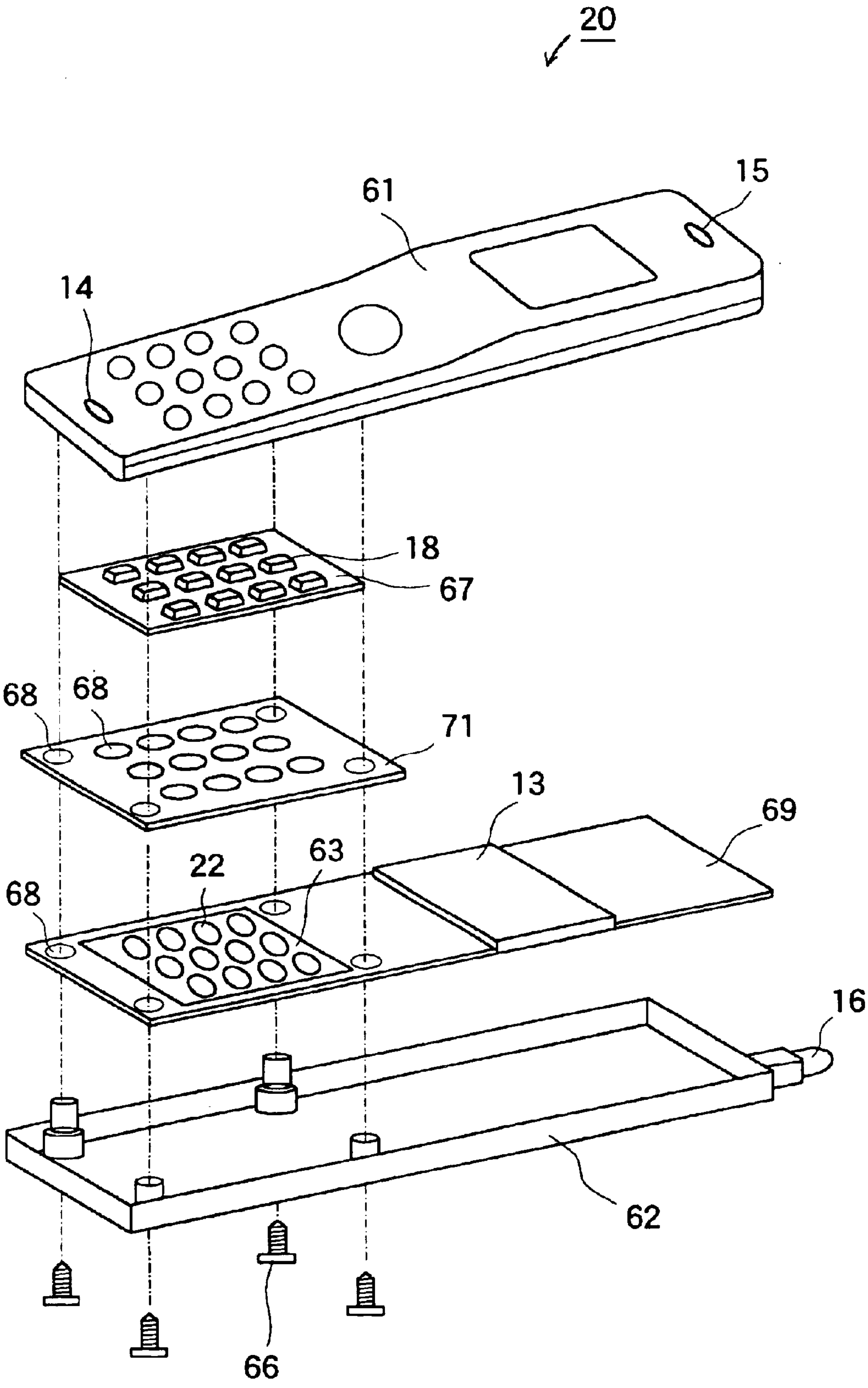
FIG. 9 is a view for explaining the assembling of the portable telephone which has the structure illustrated in FIG. 8.

FIG. 1(*a*) illustrates the external appearance of a portable electronic equipment in the form of a portable telephone in accordance with the present invention. FIG. 1(*b*) is a side elevation of the portable telephone of FIG. 1 (*a*). FIG. 2 is an enlarged cross sectional view as seen from line A—A of FIG. 1. FIG. 3 shows an example of the structure of a stopper shown in FIG. 2. FIG. 4 shows the structure of button keys and a button key seat shown in FIG. 2. FIG. 5 is a cross sectional view illustrating a modification of the button key of FIG. 2. FIG. 6 is a plan view for explaining the arrangement of the button key of FIG. 5. FIG. 7(*a*) shows in cross section another modified structure of the portable telephone as illustrated in FIG. 2. FIG. 7(*b*) is a side elevation of the portable telephone shown in FIG. 7(*a*). FIG. 8 shows in cross section a further modified structure of the portable telephone as illustrated in FIG. 2. FIG. 9 illustrates the assembling of the portable telephone having the structure illustrated in FIG. 8.

A portable telephone 10, being shown in FIG. 1(*a*), FIG. 1(*b*) and FIG. 2 as a typical example of an portable electronic equipment, includes an outer housing or casing comprising a front case 11 and a rear case 12 detachably assembled with each other, and a circuit board 29 accommodated in the outer casing for the transmission and reception of radio signals with an antenna projected from the casing. In this case, it is desirable that both cases 11 and 12 be combined or integrated with each other by means of engagement or coupling members such as mutually engaging or coupling concave portions and convex portions. Moreover, an LCD 13, a microphone 14, a receiver 15, and a plurality of key switches 17 are arranged on the surface of the front case 11. In this case, each of the key switches 17 includes a button key 18 ordinarily formed of ABS resins, etc., and a button key seat or key pad 19 ordinarily formed of silicone rubber, etc., the corresponding button key 18 and button key seat 19 being assembled into a unit. Each button key 18 is formed around its peripheral edge near its bottom surface with a flange portion 25 which slightly extends radially outward from the cylindrical side surface thereof.

A plurality of key seats 23 corresponding to the button keys 18, respectively, are mounted on that surface of the circuit board 29, accommodated in the casing of the portable telephone 10, which faces to the button keys 18. In addition, at locations corresponding to the positions of the button keys 18, there are arranged a plurality of elastic plate-shaped switch contacts in the form of click plates 22. Electronic components 21 such as LSIs, chip capacitors, etc., are assembled or mounted onto the surface of the circuit board 29 opposing to the rear case 12. Further, the front case 11 is provided on its back side (i.e., on the lower side in FIG. 2) with a plurality of stoppers 24 each of which takes a U-shaped configuration so as to surround the flange portion 25 of a corresponding button key 18. Accordingly, when a button key 18 is pushed or pressed down for dialing, etc., a corresponding button key seat 19 is caused to descend at an amount of switching operation stroke together with the button key 18, whereby a corresponding click plate 22 is pushed down to perform a switching operation. At this moment, however, the bottom surface of the flange portion 25 abuts against the stopper 24, so that the button key 18 can not descend any more in excess of the switching operation stroke.

In this manner, the button key 18, when pressed down, descends just the stroke of switching operation and travels no more than that. As a result, though the click plate 22 may be operated, any unnecessary force is not applied to the circuit board 29, thus preventing adverse effects such as brakage or disconnection of soldered portions or fine patterns of the circuit board 29. Moreover, it is possible to contribute to a downsizing of the portable telephone by limiting the stroke of switching operation in this way. In addition, the cross sectional shape of each stopper 24 which surrounds or encloses a corresponding flange portion 25 in a U-shaped configuration may be like what is shown in FIG. 2 for the above-mentioned example. However, the stopper may comprise a stopper member 24 adapted to be placed into abutting engagement with the entire periphery of the flange portion 25, as shown in FIG. 3(*a*), when viewed from the upper surface of the button key 18 in FIG. 2. Moreover, the stopper may comprise a stopper member 34 adapted to be placed into abutting engagement with the periphery of the flange portion 25 at a plurality of locations, as shown in FIG. 3(*b*). In addition, there are various ways as to which portions of the stopper 24 are integrally formed with the front case 11, as illustrated in FIGS. 7 and 8 to be described later in detail.

FIG. 4 is a plan view for explaining the structure of the button key seats used in this example. The button key seats 19 are respectively combined with the corresponding button keys 18 to provide the respective key switches 17. However, even though the button key seats 19 are of such a structure as illustrated in FIG. 2 and FIG. 3(*b*), the button key seats 19 are connected with each other to take a grid-like configuration, as shown in FIG. 4, and they are partially attached or adhered to the bottom surfaces of the corresponding button keys 18, so that the button key seats 19 can be built into the front case 11 without being obstructed by the stoppers 24. As a result, the button key seats 19 are connected with each other in a bridge-like fashion, thus improving assemblability. Besides, partially adhering the button key seats 19 to the button keys 18 provides an advantage that both the weight and the cost of the portable telephone can be reduced.

FIG. 5 is a cross sectional view illustrating a modification of the embodiment of the portable telephone 10 shown in FIGS. 1 through FIG. 4. The button keys 28 of a portable telephone shown in FIG. 5 are constructed such that the button keys 18 and the button key seats 19 of FIG. 2 are made of an elastic material such as ABS resins, silicone rubber, etc., and are integrally formed with each other while removing the linking portions bridging the respective button key seats 19 shown in FIG. 4. Thus, this arrangement is advantageous in that the weight and the cost of the portable telephone can be further reduced. In this case, the arrangement of the button keys 28 in the front case 11 can be illustrated in FIG. 6 in comparison with FIG. 4. In this regard, it is to be noted that the button keys 28, being mutually disconnected from each other, can be pushed into and assembled with the stoppers 24 in an easy manner by properly adjusting the length or size of each flange portion 35. In addition, if the button keys 28 are made of an elastic material or a material having limited elasticity such as silicone rubber or the like, such assembly becomes much easier FIG. 7(*a*) and FIG. 7(*b*) illustrate a modified form of portable electronic equipment in which the front case 11 of FIG. 2 is constructed of a front case member 41 and a front case cover 51. In the case of FIG. 7(*a*), a stopper 54 of the front case 41, being not in the form of a U-shaped configuration but in the form of an L-shaped cross section, serves to facilitate making of a mold for the front case 41, and molding and assembling operations. Upon assembling, the key switches 17 (i.e., the button keys 18 and the button key seats 19) illustrated in FIG. 2 and FIG. 4 are mounted to the front case 41 with the front case cover 51 being attached to an outer surface of the front case 41 through fitting or concavo-convex engagement, screwing, etc. The front case cover 51 serves as a stopper for preventing the button keys 18 from popping out of the front case cover 51. Of course, the front case cover 51, being detachably attached to the front case 41, can be freely and easily replaced with another one of a different design at the request of the user. That is, a designed, stylish or ornamental feature can be given to the front case cover 51, so that a plurality of front cover cases of different colors, patterns, materials, etc., are prepared and selectively used for alterations in the appearance of the casing. FIG. 7(*b*) illustrates the side profile of the portable telephone of FIG. 7(*a*).

FIG. 8 illustrates a further modified form of portable electronic equipment in which the front case is constructed of a front case member 11 and a suppression plate 71. In the case of FIG. 8, too, each stopper 64 of the front case 61, being not in the form of a U-shaped configuration but in the form of an inverted L-shaped cross section, serves to facilitate making of a mold for the front case, and molding and assembling operations. FIG. 9 is an assembly view schematically showing the assembling of the portable telephone 20 as illustrated in FIG. 8. The suppression plate 71 is clamped between the button key seat 67 and the circuit board 69, and then they are built into the front case 61 and the rear case 62, with the suppression plate 71 being held by the front case 61 and ribs of the rear case 62 and fixed by means of screws 66.

When a button key 18 is depressed, a corresponding button key seat 67 is placed into abutting engagement with the suppression plate 71, whereby the button key 18 is prevented from descending beyond a switching operation stroke. As a result, it is possible to avoid an excessive stress applied to the circuit board 69. The suppression plate 71 may be the same material as that of the front case 61 and the rear case 62 (e.g., ABS resins), and preferably it is of a light and hard material such as Mg alloys, etc.

It is to be noted that the stoppers 24 of the present invention may be provided, in the above-mentioned respective embodiments, only for a "power switch" button, an "on-hook" button and an "off-hook" button, which are frequently used for long-time pressing and hence subjected to higher stresses.

As described above, since a portable electronic equipment of the present invention as constructed in the above manner includes a stopper which serves to limit the amount of depression of a corresponding button key no matter how the button key is pushed by an operator, it is possible to avoid an excessive stress which would otherwise be applied to a circuit board. Moreover, even if the thickness of the circuit board is limited, the circuit board is hardly destroyed since a pushing or pressing force applied to a button key is received by a strong or robust casing. Accordingly, it becomes possible to form the circuit board of a limited thickness and make the stroke of each key within a relatively small range. Thus, it is easy to make the entire construction of the portable electronic equipment compact and small-sized, and it is also possible to avoid the occurrence of damage or breakage of the electronic components mounted on the circuit board and/or cracks in the soldered portions thereof.

While the invention has been described in terms of a few preferred embodiments, those skilled in the art will recognize that the invention can be practiced with modification within the spirit and scope of the appended claims.

What is claimed is:

1. A portable electronic equipment comprising:

a casing;

a circuit board accommodated in said casing and having a plurality of switch contacts formed thereon;

a plurality of button keys corresponding to said switch contacts and mounted on said casing, said button keys being adapted to be depressed for switching on and off said corresponding switch contacts from outside; and a plurality of stoppers each provided on said casing for limiting an amount of depression of a corresponding one of said button keys, wherein said button keys are each formed with a flange, and said stoppers are each formed into such a configuration as to support an entire outer periphery of the flange of a corresponding button key.

2. A portable electronic equipment comprising:

a casing;

a circuit board accommodated in said casing and having a plurality of switch contacts formed thereon;

a plurality of button keys corresponding to said switch contacts and mounted on said casing, said button keys being adapted to be depressed for switching on and off said corresponding switch contacts from outside; and a plurality of stoppers each provided on said casing for limiting an amount of depression of a corresponding one of said button keys, wherein said button keys are each formed with a flange, and said stoppers are each formed into such a configuration as to support an outer periphery of the flange of a corresponding button key in a plurality of directions.

* * * * *